March 23, 1954
C. S. ANDERSON
2,672,676
TURRET TOOLHOLDER FOR LATHES
Filed July 21, 1948
2 Sheets-Sheet 1
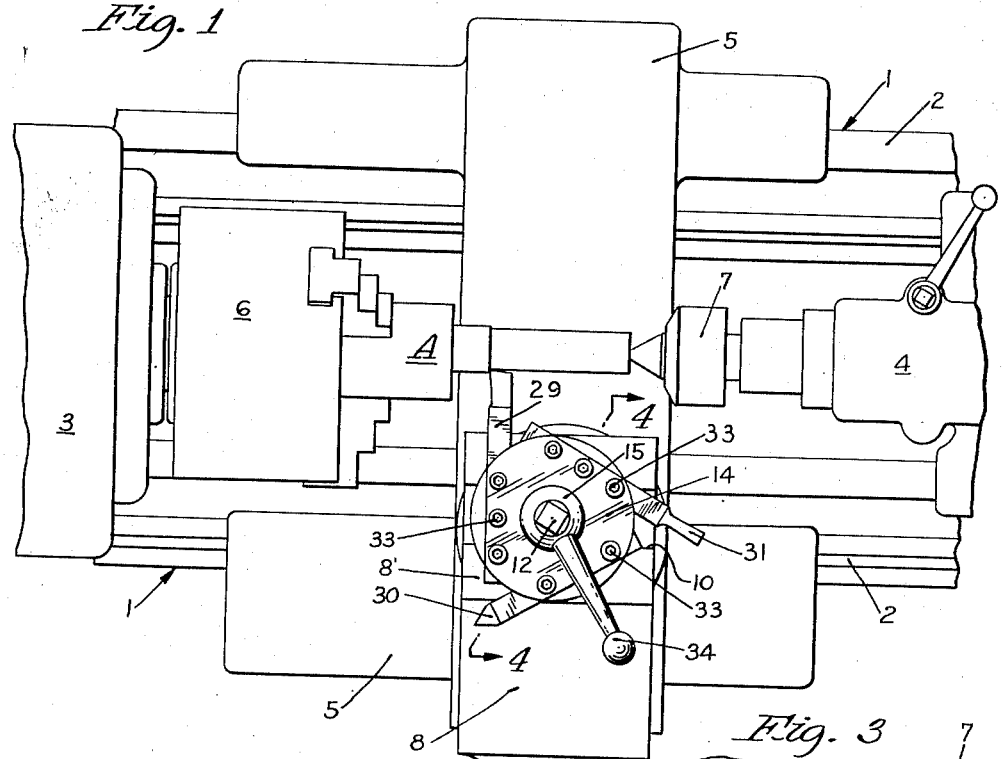
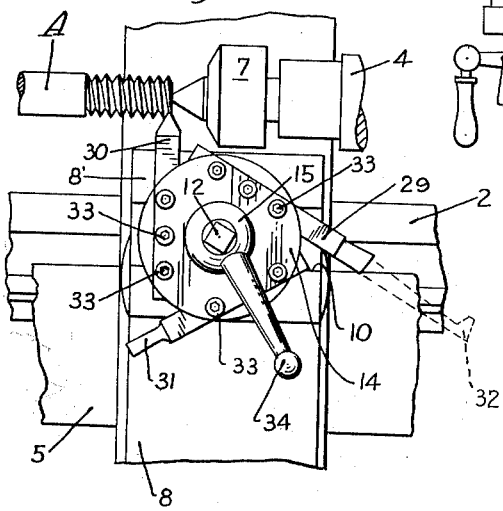
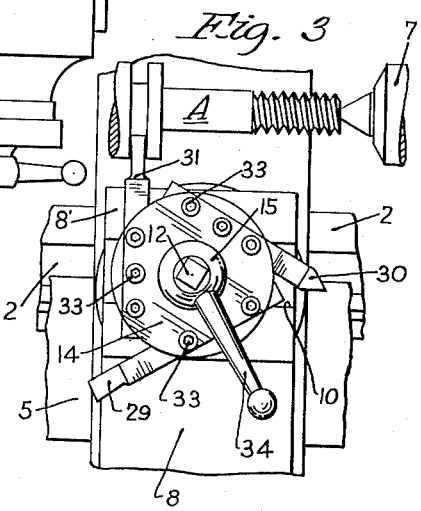
Inventor
Charles S. Anderson
By Attorneys
Merchant & Merchant March 23, 1954
C. S. ANDERSON
2,672,676
TURRET TOOLHOLDER FOR LATHES
Filed July 21, 1948
2 Sheets-Sheet 2
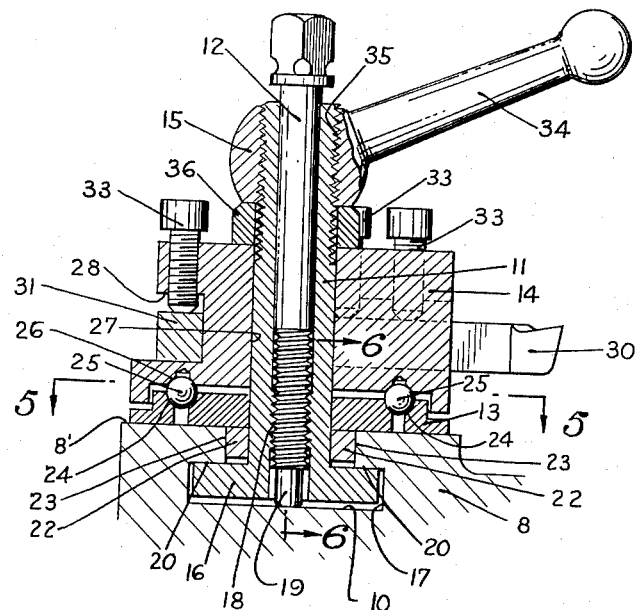
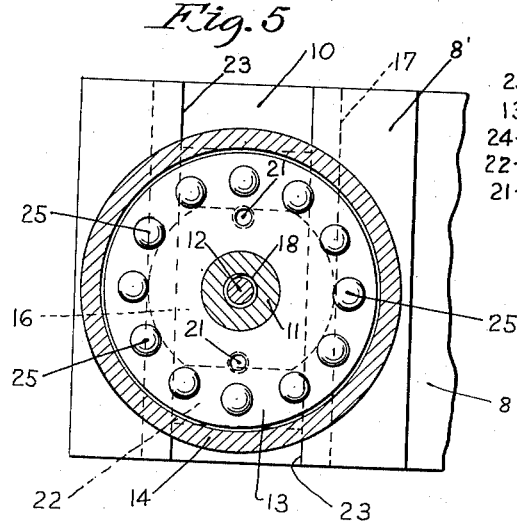
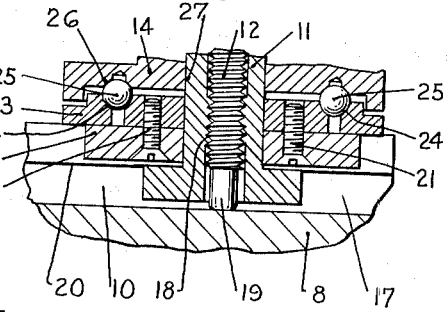
Inventor
Charles S. Anderson
By Attorneys
Merchant & Merchant Patented Mar. 23, 1954

2,672,676

UNITED STATES PATENT OFFICE 2,672,676

TURRET TOOLHOLDER FOR LATHES

Charles S. Anderson, Minneapolis, Minn.

Application July 21, 1948, Serial No. 39,985

2 Claims. (Cl. 29—48)

My invention relates generally to tool holders for lathes and, more particularly, to tool holders of the turret type, which are adapted to selectively operatively present one of a plurality of cutting tools to a work piece carried by the lathes.

When machining a work piece in a conventional lathe, particularly when a series of operations are to be performed on the work piece, different types of tools may be some times required, to wit, surface cutting tools, tread cutting tools, boring tools, cutting off tools etc. If a number of identical work pieces are to be produced, a tool holder of the turret type effects a considerable saving in time required to machine said work piece. However, the usual type of turret tool holder is rectangular in form and tools carried thereby must, under some circumstances, project a considerable distance therefrom to avoid having the turret strike the tailstock, chuck, or other portions of the lathe. This is particularly true when the work pieces are of small size. It is, therefore, a highly important object of my invention to provide a turret tool holder which may be mounted on the compound rest or the like of a lathe and which is adapted to hold a plurality of tools disposed at an oblique angle, one with respect to the other, whereby, when one of said tools is operatively positioned with respect to the work piece, the others thereof project at oblique angles to the axis of the work piece and lathe.

Another highly important object of my invention is the provision of a turret tool holder as set forth in which the tools held thereby project therefrom a minimum distance so that extreme rigidity to the tool point may be maintained.

Another object of my invention is the provision of a turret tool holder as set forth, the base of which may be quickly and easily locked to a compact rest or the like of a conventional lathe, and in which the tool-holding head thereof may be rotated to selectively bring the tools carried thereby into operative position with respect to a work piece without disturbing or loosening the base from its locked engagement with said compound rest.

Still another object of my invention is the provision of indexing detent means associated with said turret tool holder whereby the tools carried thereby may be selectively positioned at the work operating angle with respect to the work piece.

A still further object of my invention is the provision of a turret tool holder as above described which is inexpensive to manufacture; extremely simple to attach and operate, and which is rugged in construction and durable in use.

Still further highly important objects and advantages of my invention will become apparent from the following detailed specification, appended claims, and attached drawings.

Referring to the drawings, wherein like characters indicate like parts throughout the several views:

Fig. 1 is a fragmentary view in plan of a lathe, illustrating my improved turret tool holder applied thereto;

Fig. 2 is a fragmentary view corresponding to Fig. 1, but showing a different position of the tool holder;

Fig. 3 is a fragmentary view corresponding to Fig. 1, but showing the tool holder in still another operating position;

Fig. 4 is an enlarged fragmentary axial section, taken substantially on the line 4—4 of Fig. 1;

Fig. 5 is a view, partly in plan and partly in section, taken substantially on the line 5—5 of Fig. 4; and Fig. 6 is a fragmentary section, taken on the line 6—6 of Fig. 4.

In the drawings, my novel device is shown as being mounted on the compound rest of a lathe. The lathe, certain parts of which are omitted, comprises a bed 1 made up of spaced parallel ways 2, a head stock 3, tail stock 4, and carriage 5. A work piece A is shown in Fig. 1 as being held in a conventional spindle-carried chuck 6 and supported at one end by a back or stationary center 7 mounted in the tail stock 4. A compound rest 8 is mounted on the carriage 5 and is adapted to be pivotally moved with respect thereto and radially of the axis of said pivot, the radial movement being accomplished by turning a ball handle 9.

As shown, my improved turret holder is mounted on the compound rest 8 which is provided with the usual T-slot 10. In the case of lathes not equipped with a compound rest, the tool holder will be seated on the T-slot-equipped carriage-mounted cross slide of the lathe. The turret tool holder comprises a tubular bolt 11, an anchoring screw 12, a base member 13, a head member 14, and a tightening nut 15. The tubular bolt 11 is provided at its lower end with a head or flange 16 which, as best shown in Figs. 4, 5, and 6, is adapted to be contained within the enlarged portion 17 of the T-slot 10. The bolt 11 is internally threaded, as indicated at 18, to receive the threaded portion of the anchoring screw 12. The anchoring screw 12 is projectable downwardly through the bolt 11 and has a diametrically-reduced lower end portion 19 which is engageable with the bottom of the T-slot 10. Turning movement imparted to the anchoring screw 12 in one direction with respect to the tubular bolt 11 causes the head or flange 16 of the bolt 11 to engage the overlying shoulders 20 of the T-slot 10 and be frictionally locked thereto against rotary or sliding movements. When the tubular bolt 11 is once so set and locked in place, there is no necessity of disturbing the screw 12 until it is desired to remove the entire turret tool holder from the lathes. The base member 13 is flat and disc-like in form, is rotatively and axially slidably carried by the tubular bolt 11, and is adapted to rest on the flat top surface 3' of the compound rest. The base member 13 is preferably concentric with the bolt 11 and has rigidly secured thereto by means of screws or the like 21, a key 22. The key 22 extends diametrically of the base member 13 and is of a width to frictionally engage at least one side wall 23 of the reduced portion of the T-slot 10, whereby to prevent turning of the base member 13 with respect to the compound rest 2. The flat top surface of the base 13 is provided with a plurality of circumferentially-spaced recesses 24 in which are seated steel balls or the like 25. The balls 25 project above the top surface of the base 13 to provide semi-spherical indexing detents which are adapted to be seated in circumferentially-spaced indexing cavities 26 in the head 14. The head 14 is provided with a central bore 27 through which the tubular bolt 11 extends. The bore 27 is of a size to allow freedom of rotative and axial movement of the head 14 with respect to the tubular bolt 11. The head 14 is generally cylindrical in form and is provided with a plurality of channels 28 in the outer peripheral wall thereof. The channels 28 open radially outwardly of the head 14 and lie in a plane extending transversely of the axis of rotation thereof. The channels 28 are rectangular in cross section and of a size to receive and support standard lathe tools such as a surface cutting tool 29, thread-cutting tool 30, and a cutting-off tool 31. I have found, through long experience, that the lathe operations on most work pieces can be carried out by the use of not more than three different types of tools. For work pieces requiring a boring operation, a boring tool may be substituted for one of the other tools shown, such a boring tool being illustrated by dotted lines in Fig. 2 and indicated by the numeral 32. The tools are secured fast in their respective channels 28 by a plurality of clamping screws 33 extending downwardly through the head 14 into the channels 28.

The tightening nut 15 is equipped with a ball handle 34 and is screw-threaded to the threaded upper end portion 35 of the tubular bolt 11. Interposed between the nut 15 and the head 14 is a relatively heavy washer 36. Loosening of the nut 15 permits the head 14 to be rotated on the tubular bolt 11. Manual rotation of the head 14 causes a camming action to occur between the detents 25 and the cavities 26, whereby to raise the head 14 axially of the tubular bolt 11 and allow a subsequent cavity to be engaged by each detent 25. Obviously, the detents 25 and the cavities 26 are spaced equidistant and concentric to the tubular bolt 11. Detents and cavities therefor are in multiples of three, preferably twelve in number, so that, when changing from one cutting operation to another, the head is rotated exactly one-third of a complete rotation or 120 degrees of arc. The surface cutting tool 29 is shown in Fig. 1 as completing a cut on the work piece A and is operatively positioned perpendicular to the axis of the work piece A and lathe. Upon completion of this operation, the tightening nut 15 is loosened to permit rotation of the head 14, whereby to bring the thread-cutting tool 30 into operative engagement with the work piece, as shown in Fig. 2. When the thread-cutting tool 30 is operatively positioned, it also is longitudinally perpendicular to the axis of the work piece A and lathe, and the detents 25 are seated in cavities 26. Upon completion of the thread-cutting operation, the nut 15 may again be loosened and the head 14 rotated to bring the cutting-off tool into operative position with respect to the work piece A, as shown in Fig. 3. The nut 15 is, in every operating position of the tools 29, 30, and 31, tightened to securely lock the head 14 against movement.

The particular arrangement of the cutting tools in the head 14 allows the turret tool holder to be positioned relatively close to the work piece A. It will be noted that, when any one of the tools is operatively positioned with respect to the work piece A, the other tools held in the tool holder extend at an oblique angle to the axis of the work piece A and the lathe. Thus, the tool holder may be brought into very close proximity to the work piece A and particularly to the end portions thereof without danger of having one or the other of the tools not being used strike a portion of the lathe, such as the center 7, tail stock 4, chuck 6, etc., as some times occurs with the use of a rectangular turret tool holder.

In making a number of duplicate parts, it is but necessary for the operator to keep in mind the dial settings of the compound rest, cross slide, and the like, for the finishing cut of each operation on the various parts of the lathe. Then, when a particular operation has been completed, it is but necessary to rotate the head 14 to bring the cutting tool for the subsequent operation into operative position and adjust the lathe to the proper dial settings. All of the lathe operations on a work piece may thus be performed without the necessity of stopping the lathe and measuring the work piece after each operation.

My invention has been thoroughly tested and found to be entirely adequate for the accomplishment of the objectives set forth; and, while I have shown a preferred embodiment of my invention, it will be understood that the same is capable of modification without departure from the spirit and scope of the invention as defined in the claims.

What I claim is:

1. A turret tool holder for lathes comprising a tubular bolt having a head at its lower end adapted to be received in the T-slot of a compound rest or the like, an anchoring screw extending axially through said bolt and having threaded engagement therewith, the lower end of said screw projecting through the headed lower end of said tubular bolt for engagement with the bottom of said T-slot to clamp the head of said tubular bolt against the overlying shoulders of said T-slot, a base axially slidably mounted on said bolt and adapted to be seated on said compound rest, a key carried by said base and engageable with a side of the T-slot to prevent rotation of said base with respect to said compound rest, said key embracing and being axially slidable on the tubular bolt, a multiple tool-holding head rotatively and axially slidably mounted on said tubular bolt, and a tightening nut threaded on said bolt and engageable with said tool-holding head to lock the same against rotation with respect to said base.

2. A turret tool holder for lathes comprising a tubular bolt having a head at its lower end adapted to be received in the T-slot of a compound rest or the like, an anchoring screw extending axially through said bolt and having threaded engagement therewith, the lower end of said screw projecting through the headed lower end of said tubular bolt for engagement with the bottom of said T-slot to clamp the head of said tubular bolt against the overlying shoulders of said T-slot, a base element axially slidably mounted on said bolt and adapted to be seated on said compound rest, a key carried by said base element and engageable with a side of the T-slot to prevent rotation of said base element with respect to said compound rest, said key embracing and being axially slidable on the tubular bolt, a multiple tool-holding head element rotatively and axially slidably mounted on said tubular bolt, a detent on one of said elements, the other of said elements having a plurality of circumferentially-spaced indexing cavities cooperating with said detent to rotatively position said head element with respect to said base element, and a tightening nut threaded on said bolt and engageable with said tool-holding head, said nut cooperating with said detent to lock said head in predetermined indexing positions with respect to said base.

CHARLES S. ANDERSON.

References Cited in the file of this patent

UNITED STATES PATENTS

| Number | Name | Date |
|---|---|---|
| 645,211 | Petsche | Mar. 13, 1900 |
| 719,194 | Cooney | Jan. 27, 1903 |
| 1,636,167 | Borsin | July 19, 1927 |
| 2,085,131 | Tautz | June 29, 1937 |
| 2,350,585 | Carpenter | June 6, 1944 |
| 2,352,165 | Buzza | June 27, 1944 |
| 2,355,072 | Honegger | Aug. 8, 1944 |
| 2,366,079 | Wilson | Dec. 26, 1944 |
| 2,403,405 | Sirola | July 2, 1946 |
| 2,471,403 | Benes | May 31, 1949 |
| 2,579,224 | Boice | Dec. 18, 1951 |